(12) United States Patent
Bae

(10) Patent No.: US 7,010,576 B2
(45) Date of Patent: Mar. 7, 2006

(54) EFFICIENT METHOD OF GLOBALIZATION AND SYNCHRONIZATION OF DISTRIBUTED RESOURCES IN DISTRIBUTED PEER DATA PROCESSING ENVIRONMENTS

(75) Inventor: Myung M. Bae, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/158,500

(22) Filed: May 30, 2002

(65) Prior Publication Data

US 2003/0225852 A1 Dec. 4, 2003

(51) Int. Cl.
*G06F 15/167* (2006.01)
*G06F 12/00* (2006.01)

(52) U.S. Cl. ............... 709/213; 709/214; 709/216; 711/147; 711/148

(58) Field of Classification Search ........... 709/200, 709/213, 214, 216, 243, 244; 711/147, 148
See application file for complete search history.

(56) References Cited

U.S. PATENT DOCUMENTS

| | | | |
|---|---|---|---|
| 4,866,606 A | 9/1989 | Kopetz | 364/200 |
| 5,604,882 A | 2/1997 | Hoover et al. | 395/448 |
| 5,623,655 A | 4/1997 | Chisaka | 395/698 |
| 5,649,195 A | 7/1997 | Scott et al. | 395/617 |
| 5,768,538 A | 6/1998 | Badovinatz et al. | 395/200.78 |
| 5,790,772 A | 8/1998 | Badovinatz et al. | 395/182.02 |
| 5,799,146 A | 8/1998 | Badovinatz et al. | 395/182.02 |
| 5,826,253 A | 10/1998 | Bredenberg | 707/2 |
| 5,845,082 A | 12/1998 | Murakami | 395/200.56 |
| 5,893,116 A | 4/1999 | Simmonds et al. | 707/201 |
| 5,933,604 A | 8/1999 | Inakoshi | 395/200.56 |
| 5,978,842 A | 11/1999 | Noble et al. | 709/218 |
| 5,991,821 A | 11/1999 | Badovinatz et al. | 709/300 |
| 5,999,947 A | 12/1999 | Zollinger et al. | 707/203 |
| 6,016,505 A | 1/2000 | Badovinatz et al. | 709/205 |
| 6,021,118 A | 2/2000 | Houck et al. | 370/254 |
| 6,026,426 A | 2/2000 | Badovinatz et al. | 709/106 |
| 6,052,363 A | 4/2000 | Koch | 370/252 |
| 6,061,686 A | 5/2000 | Gauvin et al. | 707/10 |
| 6,070,189 A | 5/2000 | Bender et al. | 709/224 |
| 6,098,078 A | 8/2000 | Gehani et al. | 707/203 |
| 6,233,623 B1 | 5/2001 | Jeffords et al. | 709/316 |
| 6,311,209 B1 | 10/2001 | Olson et al. | 709/204 |
| 6,411,967 B1 | 6/2002 | Van Renesse | 707/201 |
| 6,574,674 B1 | 6/2003 | May et al. | 709/313 |
| 6,678,799 B1 * | 1/2004 | Ang | 711/141 |
| 6,748,381 B1 | 6/2004 | Chao et al. | 707/10 |
| 6,950,820 B1 | 9/2005 | Bae | 707/10 |

(Continued)

OTHER PUBLICATIONS

Anonymous, "Method of synchronizing personal information amongst peer applications by randomizing database exchanges between peers in list", RD 440090, Dec. 10, 2000 (abstract only).

(Continued)

*Primary Examiner*—Jack Lane
(74) *Attorney, Agent, or Firm*—John E. Campbell; Lawrence D. Cutter

(57) ABSTRACT

Syndrome values are employed as a mechanism for synchronization and consistency in a distributed data processing environment. Syndromes are computed for local resources on individual peer nodes and an aggregate syndrome is computed from the individual syndromes. This renders it easy to determine not only that a change has occurred but it also makes it easy to determine which node needs to be updated and thus avoids the needless transmission of updated contents.

8 Claims, 5 Drawing Sheets

U.S. PATENT DOCUMENTS

2001/0037311 A1  11/2001  McCoy et al. ............... 705/65
2001/0045914 A1  11/2001  Bunker ...................... 343/895

OTHER PUBLICATIONS

Birman et al., "Design alternatives for process group membership and multicast," Revision of TR 91-1185, Dec. 20, 1991, pp. 1-31.

Rhee et al., "A scalable real-time synchronization protocol for distributed systems," Dept of Computer Science, Univ. of Warwick, UK, IEEE, 1995, pp. 18-27.

Samaras et al., "Managing transaction identifiers in the peer-to-peer distributed transactional environment," Proceedings of ISCA International Conference, Dijon, France, Sep. 25-27, 1996, vol. 2, pp. 796-803.

IBM Pending U.S. Appl. No. 09/791,281, filed Feb. 23, 2001, "Maintaining consistency of a global resource in a distributed peer process environment," pp. 1-16 plus 2sheets of drawings.

IBM Pending U.S. Appl. No. 09/968,179, filed Oct. 1, 2001, "Synchronizing Processing of Commands Invoked Against Duplexed Coupling Facility Structures," pp. 1-245 plus 24 sheets of drawings.

Kaashoek et al. "Group Communication in the Amoeba Distributed Operating System," IEEE 11th International Conference on Distributed Computing Systems, Texas, 1991, pp. 222-230.

Kuo et al. "Fixed-Priority-Driven Open Environment for Real-time Applications,", IEEE Real-Time Systems Symposium, 20th, Phoenix, Dec. 1-3, 1999, pp. 255-267.

"Network Selective Resource and Status Information Distribution,"IBM Technical Disclosure Bulletin, Sep., 1991, pp. 377-379.

* cited by examiner

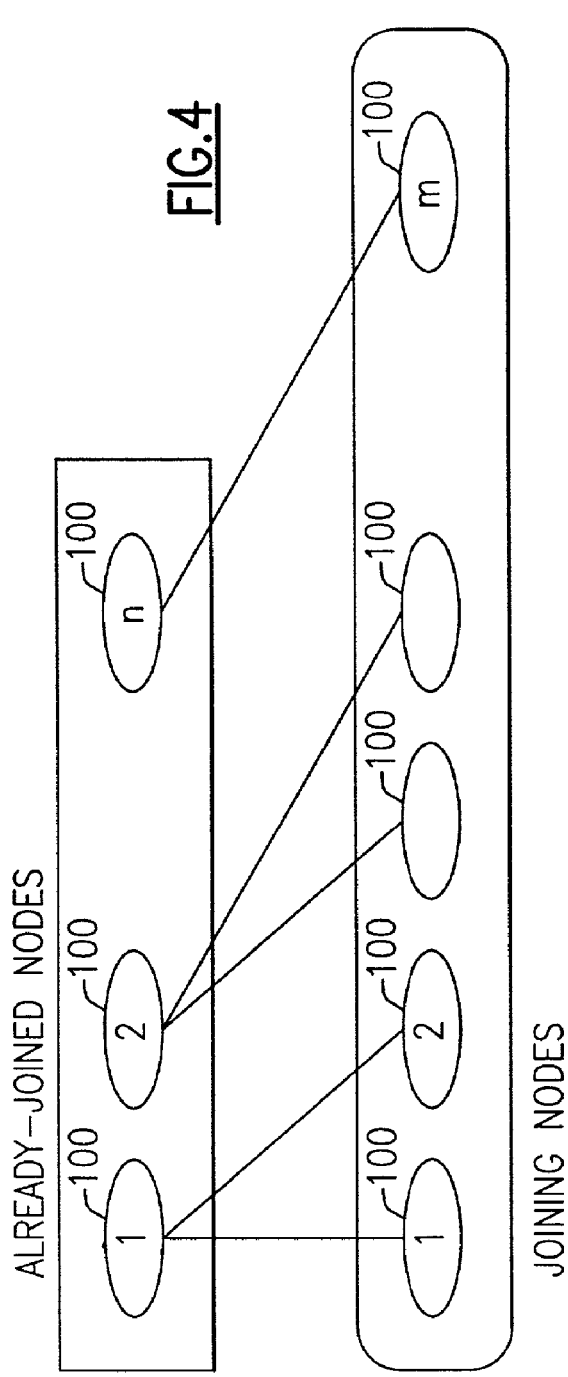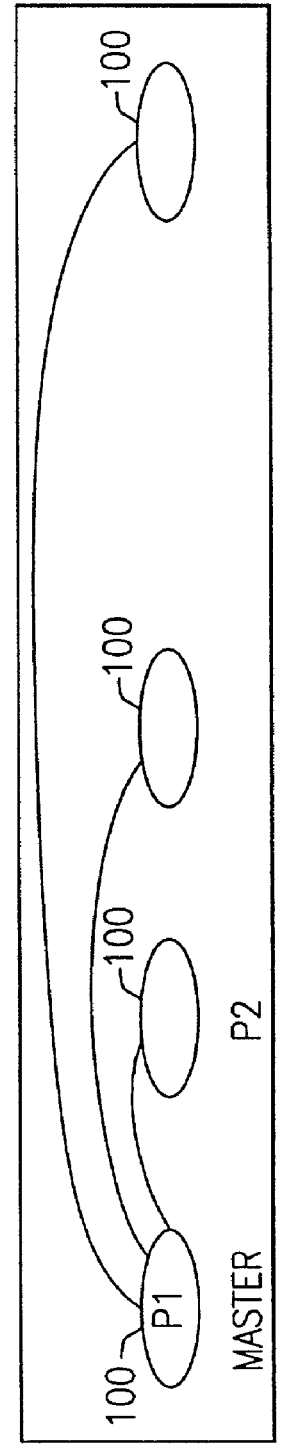

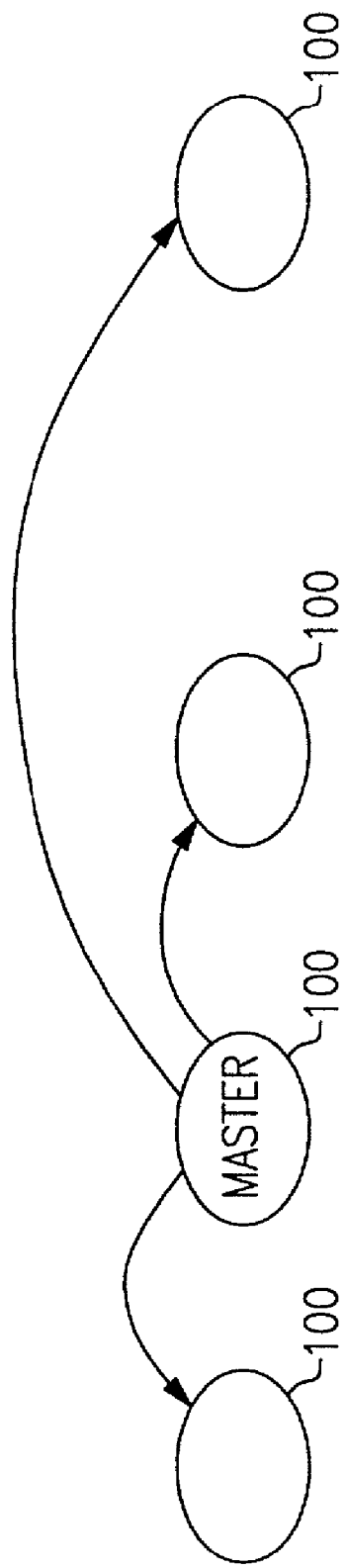

EFFICIENT METHOD OF GLOBALIZATION AND SYNCHRONIZATION OF DISTRIBUTED RESOURCES IN DISTRIBUTED PEER DATA PROCESSING ENVIRONMENTS

BACKGROUND OF THE INVENTION

The present invention is generally directed to distributed data processing environments. More particularly, the present invention is directed to methods and systems for synchronizing global resources in an efficient manner. Even more particularly, the present invention is directed to the use of local and aggregate syndromes as a mechanism for maintaining consistent, synchronized global resources.

In distributed data processing environments, distributed applications often require information which includes information about peer processes or nodes. This information includes such things as globalized resource or configuration data regarding distributed resources or distributed configuration data. In other words, each peer process has its own set of resource (that is, it has one of the distributed resources), and also uses collected resources belonging to all peer processes (that is, uses globalized resources).

One of the solutions to the problem of global resource synchronization (that is, global resource consistency in the temporal domain) in a distributed data processing environment is the use of a central data repository to store copies of the resources so that every peer process is able to access, from one location, a globalized view of the resources. This method provides an easy way to globalize the distributed resources by simply updating the single central repository without introducing any concern for synchronization of the global resource between peer nodes. However, this method, with its central repository could easily become not only a single point of failure but could also easily become a bottleneck which severely and negatively impacts system performance. Without some form of central repository, coordination or synchronization, peer processes work incorrect or even fail. This is because, in this approach, globalization is carried out through a single location: every peer process is trying to access this location and thereby causes a performance degradation. Accordingly, the synchronization methods proposed herein seek to avoid such problems.

Another solution to the problem of synchronization of globalized distributed resources is the replication of the global resources on every peer node. In this approach, there is the advantage that there is no single point of the failure or performance bottleneck, because every peer node keeps a replicated copy of the globalized resource. However, there are still several issues and areas of concern that occur with resource replication as a solution method. For example, there is the issue of how one can efficiently distribute the resources. Additionally, assuming that one starts with a consistent set of distributed resources, there is also the issue of how to efficiently synchronize the replicated copy of the globalized resource as changes occur in the distributed environment. These concerns are exacerbated when the distributed resources are determined for the first time, as for example when a new node joins the peer computing environment and when the distributed resources need to be resynchronized whenever the one of distributed resources is changed or when one of the peer nodes either fails or leaves the established distributed environment.

Unfortunately, it is not only difficult to notify all of the peer processes, in a synchronized manner, concerning changes made in the distributed resources (for example, changes in their content, as opposed to other resource attributes such as time of last local access) so as to preclude the use of different resource contents for the globalized resource amongst the peer processes (or nodes), but it is also difficult to optimize the globalization of the distributed resources. That is to say, it is difficult to provide updated information to a plurality of peer applications running in a distributed system, particularly if the information needed is voluminous. Additionally, if a few peer processes miss the notification of the changes or receive the notifications asynchronously, the overall coordination between peer processes may fail or may cause unexpected and undesired results. The negative impact of the inconsistency problem is even greater under the following situations:

If two nodes have two different views of the globalized resource, the overall coordination between peer processes may fail, and in many cases, the distributed peer processes may produce unexpected effects.

The globalization process for synchronizing distributed resources between the nodes may introduce a severe performance hit, particularly at startup time when all of the nodes are involved.

If there is no automatic mechanism for the peer processes to maintain the globalized resource, there is also always a chance for inconsistent use of the globalized resource between the peer processes. As an example, it may happen that one of the peer processes does not receive the notification of the change in the distributed resource.

If the distributed resources are changed while a peer process is temporarily isolated, it is not easy for the peer process to get the current level of the globalized resource when isolation ceases.

The consistency problem between peer processes has been dealt with to limited degrees in other systems, see "Group Communication in the Amoeba Distributed Operating System" by M. F. Kassshoek and A. S. Tanenbaum, Proceedings of the IEEE 11th International Conf. on Distributed Computing Systems, pp. 222–230, and "Design Alternatives for Process Group Membership and Multicast" by K. P. Birman, R. Cooper and B Gleeson, pp 1–31, 1991. The contribution to this art added by the present invention is the consistent synchronization and efficient globalization of the distributed resources provided, and the "ease of use" in identifying specific semantics related to the consistent and automatic propagation of the notifications between peer processes. This allows an application program to use the resource in a consistent manner at all times.

Therefore, it is important that applications have a mechanism to notify all peer processes concerning changes made to distributed resources in a synchronized manner as well as having a mechanism for the automatic propagation of the changes between peer processes. Applications which execute in an environment with tight consistency requirements should therefore be able to benefit from being provided with an infrastructure that not only provides synchronization but which also provides propagation of the changes in distributed resources. However, it is very difficult to create such infrastructure; if all of the applications are forced to do it on their own, each one runs the risks of repeating the same errors, and they may still lose consistency with each other. Accordingly, the present invention provides an infrastructure which solves these problems in an efficient manner which is available to all applications running in a distributed data processing environment.

SUMMARY OF THE INVENTION

In accordance with a preferred embodiment of the present invention a method is provided for synchronizing global resources in a distributed data processing environment. The method comprises the steps of: generating a local syndrome within each one of a set of peer nodes in the distributed environment, the local syndrome being a function of the contents of the shared global resource (that is, the replicated globalized resource); generating an aggregate syndrome as a function of the local syndromes; updating local versions of the shared global resources upon receipt of an aggregate syndrome which does not match the local version of the aggregate syndrome; and transmitting new local syndrome values to the peers following the update operation. In particular, the present invention takes advantage of the generation of syndrome values which provide a shortened indication of whether or not a given globally shared resource has changed. Furthermore, the present invention also takes advantage of the generation of an aggregate syndrome from a plurality of local syndromes so as to provide a degree of granularity in determining which peer nodes include shared global resource information which does not match the rest.

Accordingly, it is an object of the present invention to improve the operation of distributed data processing systems.

It is also an object of the present invention to provide a mechanism to indicate changes in shared global resources in distributed data processing systems.

It is also a further object of the present invention to provide a mechanism which facilitates the entry and removal of nodes in a clustered data processing environment.

It is yet another object of the present invention to take advantage of existing Group Service interfaces, protocols and utilities to improve upon the sharing of global resources.

It is a still further object of the present invention to provide synchronization of global resources without exchanging the full content of the globally shared resource.

It is also an object of the present invention to provide consistent notification of changes in globally shared resources in a distributed data processing environment.

It is another object of the present invention to significantly improve access to globally shared resources.

It is a still further object of the present invention to take advantage of existing API's (Application Programming Interfaces).

It is also an object of the present invention to permit individual peer processes to track changes in the global resources.

Lastly, but not limited hereto, it is an object of the present invention to promote the utilization of distributed data processing environments.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 4 is a block diagram illustrating the distinction between nodes already present within a group of nodes and those nodes in the process of joining the group particularly with respect to the establishment of shared global resources;

FIG. 5 is block diagram illustrating the role of the master node;

FIG. 7 is a block diagram illustrating the handling of a changed resource using the state change protocol and message broadcasting.

DETAILED DESCRIPTION OF THE INVENTION

Figure 1:
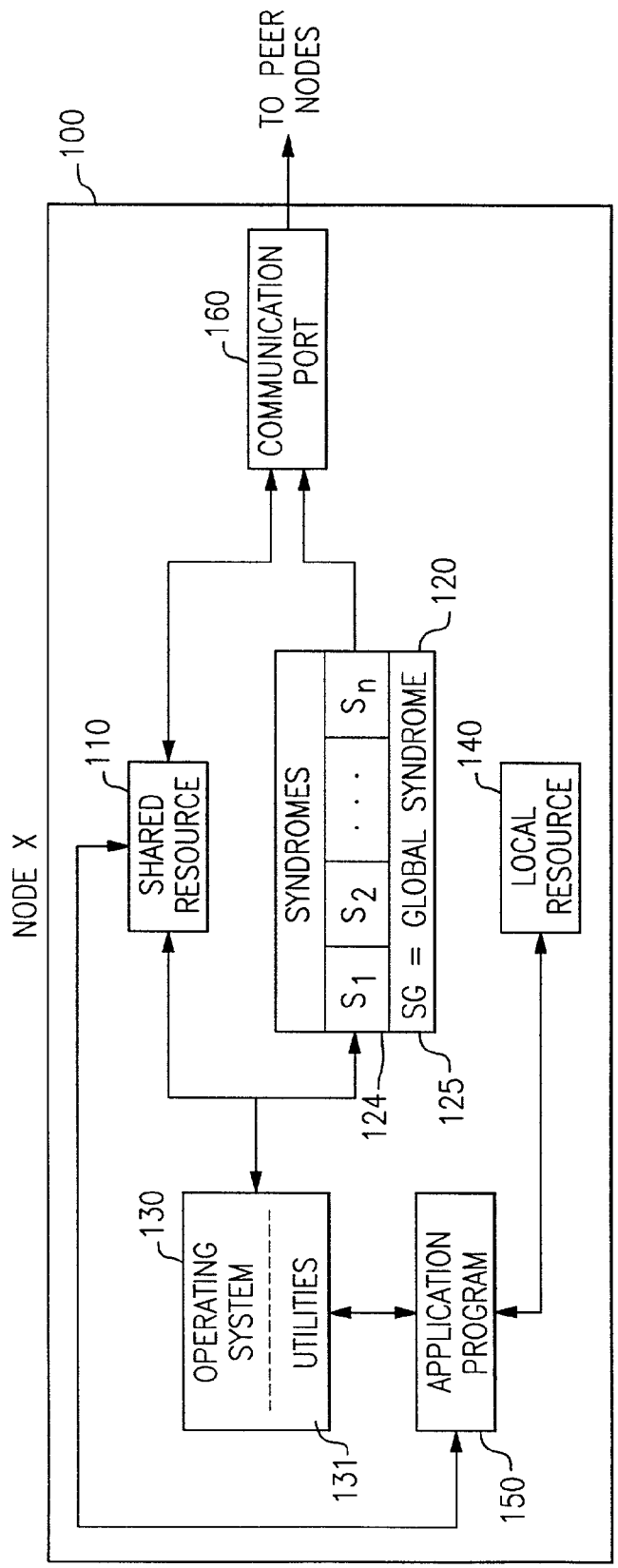
FIG. 1 is a block diagram illustrating the structure present in a single node used to carry out the method of the present invention.

A proper understanding of the operation of the present invention is best had from first considering the problems intended to be solved. These problems include:

Distributed applications with peer processes running on network connected nodes find it difficult to maintain replicated globalized resource in a consistent and efficient manner.

Globalization and synchronization of distributed resources is generally not optimized, especially during the startup of peer processes.

Previously isolated peer processes, which miss a notification of a change of the distributed resources, will still use the old resource content of the globalized resource while other peer processes will use newer (inconsistent) contents.

The present invention solves the above problems by providing the following:

The infrastructure of the present invention provides a mechanism to guarantee synchronous notification between peer processes. Consistent notification is provided to applications which connect through an API (Application Programming Interface) whenever the content of the distributed resources changes. This notification contains an indication (for example, an aggregate syndrome) of the currency of the globalized resource which is currently used by the sending peer process.

Each resource is identified with a small characterizing value or syndrome. There is also provided an aggregate syndrome which is used to know whether two globalized resources are same. Through the use of the syndrome, synchronization is efficiently performed without exchanging the entire contents of the resources.

As a follow-on to the above, consistent notification of the aggregate syndrome is sent to the applications whenever the content of the local distributed resource is changed, as well as whenever each peer process starts up.

Each peer process holds a local persistent copy of the globalized resource and its local distributed resource as well as their syndromes so that the number of required globalization and synchronization events for the distributed resources is significantly reduced to near optimum performance values.

Therefore, applications which employ the features of the present invention have the following general advantages:

Using consistent notification of the aggregate syndrome, applications always maintain consistent replicated and globalized resources between peer processes. If a change to one of the distributed resources is made, all peer processes are automatically notified so that they can reincorporate the globalized resource in a synchronized manner.

By maintaining a replicated copy of the globalized resource on each node, performance in accessing the globalized resources is substantially optimized.

Because of the use of syndromes, synchronization between the nodes is essentially optimized without exchanging the full contents of the resources.

Furthermore, applications running on the peer nodes are relatively easier to use and to construct because of the incorporation of ease-to-use APIs, while still achieving globalized resource consistency.

Each peer process also keeps track of consistent membership of the peer processes.

The present invention further provides a simple abstraction for solving similar problems, as well as for solving the replication problem for distributed resources.

To achieve the goals described above, the following concepts and functionalities of Group Services system software are used. These services are provided with the software that accompanies pSeries data processing systems offered by the assignee of the present invention. These concepts and functionalities include:

Group Membership: a list of members forming a group of data processing nodes.

Joining/Leaving a group: the joiner becomes a member of the group. Once joined, all members are notified when a member joins, leaves, or fails the group. If a member fails, the failed member is removed from the group.

State change protocol: a mechanism which provides a state value which is communicated to the members of a group and which assists in providing synchronization between the (sometimes physically remote) nodes.

The following methods are used for communication between peers in distributed systems:

Point-to-Point messaging: messaging between two peers within the group.

Gathering messages: a member receives messages from many senders from within the membership group.

Broadcast message: a mechanism to broadcast a message to the members of a group.

In the present context, these messaging primitives are assumed as already implemented. They may be implemented using the Group Services protocol, as described above for the pSeries of machines, but they are not limited to the Group Services protocols and any similar set of communication tools may be employed. The only important feature is the behavior indicated above.

Attention is now more specifically focused upon how the goals and objectives of the present invention are achieved in terms of currently available resources, such as the communication utilities described above. In particular, attention is directed to FIG. 1 which illustrates for Node x (reference numeral 100), a single peer node in a distributed data processing network, the physical structures and the data structures employed in the present invention. Node 100 includes application program 150 which communicates with operating system 130 through the use of API's presented as an interface by operating system 130. Operating system 130 also includes utilities 131 such as the communication and Group Services utilities described above. These utilities are used for sending and receiving messages and for performing operations which permit nodes to join and leave the membership group and which also allow for soft failures which do not bring down the whole system when single or even multiple peer processing nodes fail.

FIG. 1 also illustrates the fact that application program 150 often accesses purely local resource 140. For example, local resource 140 might include a file containing initialization, ownership or configuration information for application 150. However, and more importantly for the present invention, node 100 also includes shared resource 110 which is communicated to other peer nodes via communication port 160, of which there may be several at each node. Even importantly, node 100 includes syndrome information 120. In the present invention, syndrome information 120 includes information of two types: a plurality of local syndromes 124 (labeled $s_1, s_2, \ldots, s_n$) and global syndrome SG (reference numeral 125). The local syndromes, $s_i$, are generated based on the contents of shared resource 110; likewise, the aggregate syndrome is based on the individual local syndromes: $s_1, s_2, \ldots, s_n$. The present invention is particularly directed to handling the problem of changes occurring in shared resource 110. As used herein, and in the appended claims, when it is said that a syndrome is based upon certain data or is generated from certain data, it is meant that what is produced is a much shorter string of bits which easily reflect changes made in the contents of the resource (as in the case of the local syndromes) or which easily reflect changes made in individual ones of the syndromes (as in the case of the aggregate syndrome). When changes are made to the contents of a resource or are made in the local syndromes, these changes are thus almost always reflected in the corresponding syndromes which thus serve as "stand ins" or "substitutes" for knowing the entire resource content or for knowing each individual one of the local syndromes. Knowing that a shared resource has not changed means that it is not necessary to resynchronize (that is, make consistent throughout the distributed system) via an exchange of updated contents.

Figure 2:
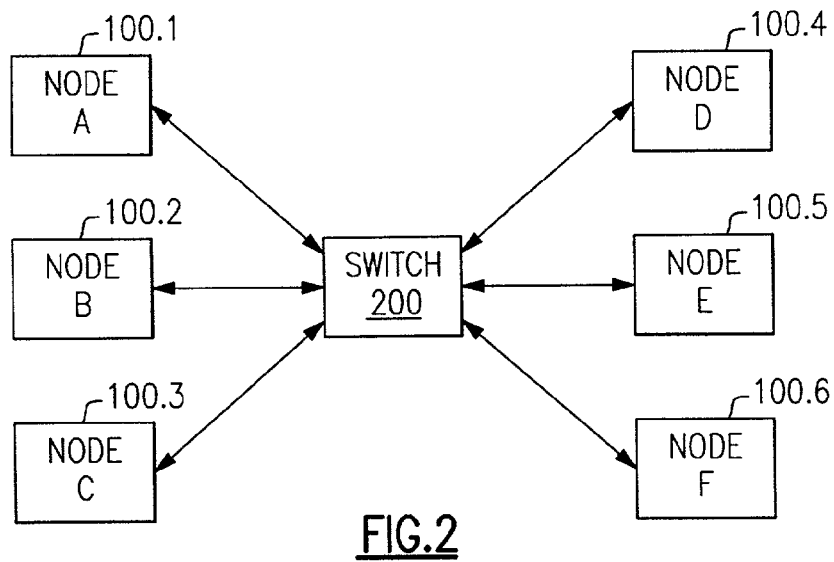
FIG. 2 is a block diagram illustrating a collection of nodes and a switch used for node to node message transmission such as that employed in the above-mentioned pSeries machines.

While FIG. 1 illustrates the structure of a typical node operating in the context of the present invention, a more expansive view is shown in FIG. 2 which illustrates one form of a distributed data processing environment. In particular, the environment shown in FIG. 2 depicts a standard configuration of nodes (100.1 through 100.6) which are connected with a system of message exchange through switch 200. This is a typical configuration for the above mentioned pSeries of data processing systems.

Attention is now focused upon specific mechanisms for carrying out the methods recited herein so as to achieve the goals, purposes and objects stated above.

How the Resources are Stored and Represented

Figure 3:
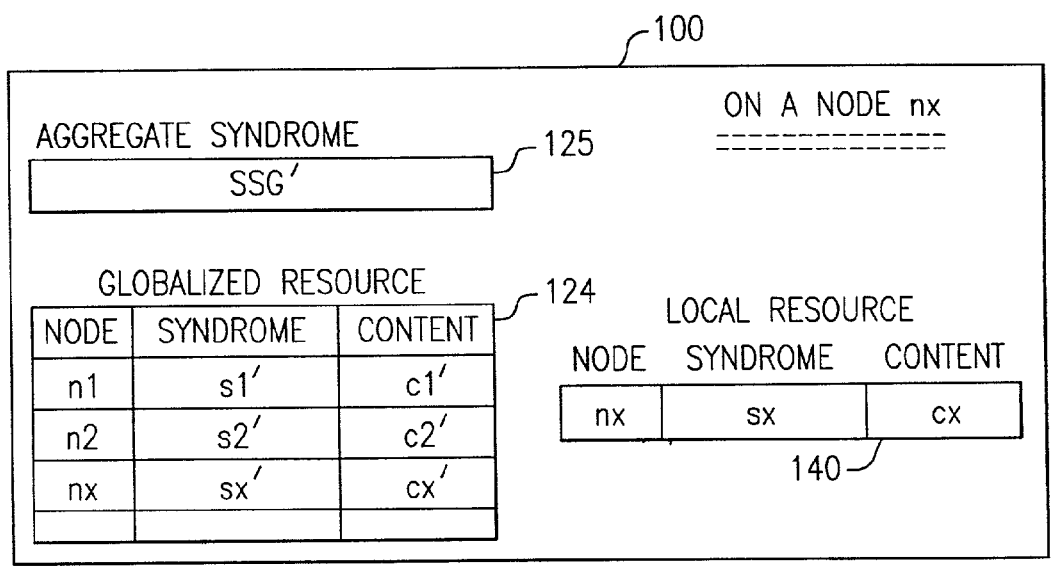
FIG. 3 is a block diagram illustrating resources present on a single node.

Each node has local resource 140 which is managed (or updated) locally and replicated globalized and aggregated resource 110 which consists of all local resources (see FIG. 1). In FIG. 3, the local resource is the information which is managed by the node. The globalized resource is the collection of the local resources. One of the major objects of the present invention is to aggregate the local resources and to replicate them efficiently and consistently. Furthermore each resource (either aggregated or local) is represented via two entities: its content and its syndrome.

The content is the resource itself, which can be large (as for example, in the case of a large data file or database file). However, the syndrome of the resource comprises a relatively small amount of data which is represented as a function of the content:

syndrome=$S$(content)

In this context, the function S generally satisfies the following conditions. If S associates, via a candidate function mapping, syndrome $s_1$ with content $c_1$, and correspondingly associates syndrome $s_2$ with content $c_2$, thus implying that one can write $s_1=S(c_1)$ and $s_2=S(c_2)$, where the parentheses denote a function relationship between the entities specified, it is generally, if not almost always, the case that:

if $s_1=s_2$, then $c_1=c_2$, but that if $s_1 \neq s_2$, then $c_1$ could be, and typically is, different than $c_2$.

In other words, by comparing two syndromes, $s_1$ and $s_2$, one can compare whether two contents (that is, $c_1$ and $c_2$) are same, or maybe not.

The specific function S which is chosen to satisfy the above described properties is not critical. It could comprise a monotonically increasing or decreasing value as a function of the contents. It could just as easily comprise a cyclic redundancy check (CRC) code, or a collection of such codes, or it could even the comprise MD5 digest code developed by Ronald L. Rivest of MIT (which takes as input a message of arbitrary length and produces as output a 128-bit "fingerprint" or "message digest" of the input), or any other codes which enables the resources to be distinguished with high probability. Certainty of distinction is not essential. It is also worth noting that the syndrome function used in the generation of the local syndromes s, does not have to comprise the same syndrome function which is used to generate the aggregate syndrome. However, for purposes of simplicity, implementation and ease of understanding, the same syndrome generating function, S, is preferably used both for the generation of local syndromes as well as for the generation of the aggregate syndrome.

If the distributed local resources is to be updated only on a single node, the function, $s_1$, is preferably a monotonically increasing or decreasing function since then the resulting value is uniquely mappable to a resource. However, for the globalized resource, CRC or MD5 coding functions are preferred candidates since they are more easily aggregated at any one of nodes.

Furthermore, the aggregated syndrome, SG, is computed from the syndromes of the globalized resource:

$SG=S(s_1+s_2+s_3+ \ldots +s_n)$, where $s_1+s_2+s_3+ \ldots +s_n$ is a collection, in the sense of a concatenation of all distributed syndromes, rather than indicating a modulo-2 or exclusive-OR summing operation.

The globalized resource comprises the distributed local resources and its aggregated syndrome is based upon (that is, is a function of) all of the local syndromes. Therefore, two globalized resources are different if two aggregated syndromes are different.

Overview of System Operation

Attention is now focused upon different ones of the relevant events that occur in a distributed data processing system. These include the situations of having a new node join the group, updating resources and handling peer process failure or stoppage.

When a Node Starts Up

Figure 6:
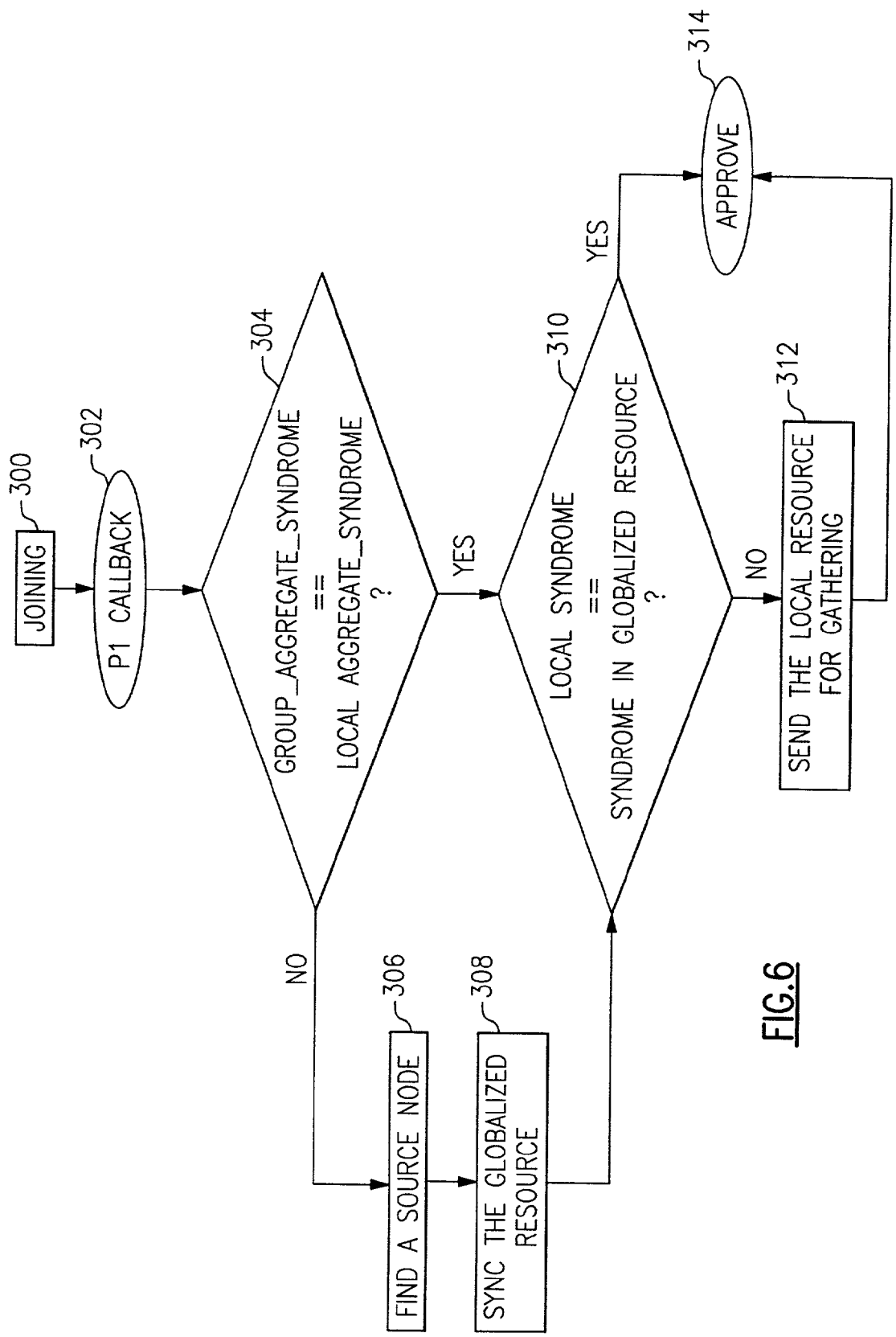
FIG. 6 is a flow chart illustrating a method used in the process of joining a peer node to a group.

See FIG. 6 for the flow chart of the process employed when a new node joins an existing group. When a peer process starts up, the new node joins (entry step 100) a Group Services group, global_group, using the Group Services API, through which the system of nodes is then notified of membership change events as well as being notified of the state change events, as described, for example, in U.S. Pat. No. 6,026,426. In the first phase of join approval notification, the already-joined processes do nothing, while the joining peer process carry out the following operations:

(i.) Each joining peer process is provided with the group global_group's state value called group_aggregate_syndrome (GSG) from the join notification. Every peer process is guaranteed to receive consistent notification of the join operation. This guarantee is part of Group Services semantics, per reference to U.S. Pat. Nos. 5,799,146 and 5,768,538.

(ii.) (On the joining nodes) If the group_aggregate_syndrome (GSG) is not same as the stored aggregate_syndrome (SSG') (see step 304 in FIG. 6), the stored global resource on the local node must be different from the global resource on the already joined peer nodes. Accordingly, it needs to synchronize the global resource from the existing peer nodes. To perform this synchronization, the following steps are carried out:

(1) Find a peer source node from the already joined nodes as shown in FIG. 4, which particularly suggests the utilization of load-balanced downloads for this purpose. See step 306.

(2) Send the locally stored list of syndromes ($s_1'$, $s_2'$, ..., $s_n'$) to the selected source node. See step 308.

(3) (On already joined nodes) On the receipt of the syndromes ($s_1'$, $s_2'$, ..., $s_n'$) from a joining nodes:

(a) The source node computes the difference between its globalized resources and the sender's resources by comparing the received syndromes. See step 310.

(b) the source node sends the content of the distributed resources which are not the same in the sender's node. Note that only different resources are transferred from the already joined nodes to the new joining nodes. See step 312.

(4) After synchronization the stored globalized resource is the same as the globalized resource on the already-existing nodes.

(5) Go to the next step.

(iii.) (On joining nodes) Now the globalized resource on each joining node will be same as the globalized resource on the already joined nodes.

(1) If the local syndrome, $s_x$, is different from the syndrome in the stored syndrome ($s_x'$) for the node in the globalized resource, the following steps are carried out (note that if the syndromes are different, the local node also updates the local resource which is not yet reflected in the globalized resource):

(a) Send the local syndrome to the master node which is the first node in the membership list of the group, global_group. Note that Group Services provides a consistent ordered list of the membership to all members, so that all peer nodes see the same node as their master node.
  (b) Wait for the new updated globalized resource from the master node.
  (c) By collecting the distributed resources via a master node, the collection procedure is simplified and optimized. This method provides an immediate improvement in the performance in the case of node startup since, at first startup, most of the nodes would be joining nodes.
(2) Vote "APPROVE" to the join protocol as an indication of completion of the change request. See step 314.
(3) Wait for the "approve" notification.
(4) Upon the occurrence of another notification phase, get the new group_aggregate_syndrome (GSG) from the group state value.
(iv.) (On the master node) The master node is waiting for the arrival of messages containing the syndromes, $s_x$, from the joining nodes until all of the members have voted.
  (1) Update the globalized resource with the new collected remote resources ($s_x$).
  (2) Send out the updated globalized resource to all nodes (including already-joined and joining members).
  (3) Compute the new aggregate syndrome (SG) using the collected resources.
  (4) Vote APPROVE with the new state value change (group_aggregate_syndrome) with the updated aggregate syndrome.
(v.) (Note that any failures during the joining process causes rejection of the protocol and effectively restarts the join process from the beginning).
(vi.) (Also note that the master node is simply a first member of the membership list. In the case of failure of the master node, the next member automatically becomes the new master node)

When a Local Resource is Updated (1.) (Node with the changing local resource) (See FIG. 7.)
  (a.) Compute the new local syndrome, $s_x$, and update the globalized resource with the changed local resource.
  (b.) Compute the new aggregate syndrome, SSG', using the syndromes in the globalized resource; SG=S ($s_1'+s_2'+\ldots+s_n'$). Note that the globalized resources on all already-joined nodes are same,
  (c.) Propose a state-change protocol, per reference to U.S. Pat. Nos. 6,026,426 and 5,768,538, with the new aggregate syndrome (group_aggregate_syndrome, SSG'), and send new updated globalized resource changes (that is, only send the "deltas") to all nodes in the group.
  (d.) On the receipt of the first phase of state value change protocol, vote "APPROVE".
  (e.) On the rejection of state value change, restart the state value change protocol.
(2.) (Other nodes) On the receipt of the first phase of the state value protocol, the following steps are carried out:
  (a.) Wait for the updated globalized resource (for example, the "deltas") from the proposed node.
  (b.) On the receipt of the updated globalized resource, compute the new aggregate syndrome, SSG' by accounting for the new updated globalized resource.
  (c.) Compare the new computed aggregate syndrome with the group_aggregate_syndrome which is in the state value. If they are same, vote "APPROVE".
  (d.) If they are not same, vote "REJECT" as an indication that a "retry" operation is to be undertaken.
  (e.) On approval, replace the stored globalized resource with the updated globalized resource.

When a Peer Process Fails or is Stopped

Group Services automatically issues a failure protocol to the peer processes when a peer process or node fails. There is no need to have special action other than voting "APPROVE".

Load-Balancing of Downloads When Multiple Peer Members are Started at Once

As shown in FIG. 4, if multiple peer members join at once and their aggregate syndromes are different from the already-joined nodes (which means the joiner are out of sync), the joining members need to sync their globalized resource with the globalized resource in the already-joined members. Instead of synchronizing with one of the nodes, the synchronization is preferably accomplished in parallel by distributing the synchronization load. For example, if the number of already joined nodes is "n" and the number of joining members is "m," then each already-joined node supports ceiling(m/n) joining nodes to transfer the new globalized resource, as suggested in FIG. 4.

Gathering the Changes of the Distributed Resources

As shown in FIG. 5, when multiple members join at once and their local resources are already updated, they need to be collected. The first member in the membership list is considered, by default, to be the master node. All of the other nodes send the updates to the master node. The master node gathers them and broadcasts the final collection to all members.

While the present invention has been described above in terms of its usage on an IBM pSeries machine which includes a plurality of nodes and which includes operating system level programs, interfaces, protocols or utilities such as Group Services and Topology Services which facilitate implementation of the methods set forth above, it should be fully understood that the concepts disclosed herein are equally applicable for usage in any distributed environment. It is also noted that while the present invention has been described above in terms of specific syndrome functions, it is noted that while the ideal syndrome maps all different values for the content of the globally shared resources into different syndrome values, this is neither strictly possible nor required since the present invention achieves its goals of efficiency even if there are infrequent (or more likely, rare) instances where communication of relatively large amounts of shared global resource information (content) occurs. In short, syndrome perfection is not a required aspect of the present invention.

It is also noted that the description above is particularly addressed to the situation in which the shared global resource is a data file stored on or in a nonvolatile data storage medium such as a rotating magnetic or optical disk memory system. However, it is noted that the shared global resource also includes information stored in a volatile memory system such as system RAM (Random Access Memory).

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for synchronizing global resources in a distributed data processing environment, said method comprising the steps of:

generating a local syndrome within each one of a set of peer nodes in said environment, said local syndrome being a function of resource content for those resources to be shared globally;

generating an aggregate syndrome as a function of said local syndromes;

updating local versions of said resources upon receipt of a non-matching aggregate syndrome; and transmitting to said peers new local syndrome values following said updating operation.

2. The method of claim 1 in which said resource is a file.

3. The method of claim 1 in which said resource is a database.

4. A method for detecting a change in a resource shared amongst a plurality of nodes in a distributed data processing environment, said method comprising;

detecting a change in an aggregate syndrome which is itself a syndrome of a plurality of local syndromes generated for copies of the resource respectively within each of said nodes.

5. The method of claim 4 in which said aggregate syndrome and said local syndromes are determined in the same way.

6. The method according to claim 4, comprising the further steps of:

generating the plurality of local syndromes; and changing the aggregate syndrome based on said generated plurality of local syndromes.

7. A method for joining a node to a group of nodes in a distributed data processing environment, said joining method comprising the steps of:

providing the joining node with an aggregate syndrome which is a syndrome of syndromes based upon at least two shared resources resident in nodes which are already members of the group; and examining said aggregate syndrome to determine which, if any, of said resources need to be synchronized.

8. The method of claim 7 further including a step of synchronization in which one set of nodes within said group transmits resource update information to a second set of nodes within said group.

* * * * *